United States Patent
Rembold et al.

[11] Patent Number: 6,155,499
[45] Date of Patent: Dec. 5, 2000

[54] INJECTION VALVE, PARTICULARLY FOR DIRECT INJECTION OF FUEL INTO THE COMBUSTION CHAMBER OF AN INTERNAL COMBUSTION ENGINE

[75] Inventors: Helmut Rembold, Stuttgart; Martin Müller, Möglingen; Christian Preussner, Markgröningen, all of Germany

[73] Assignee: Robert Bosch GmbH, Stuttgart, Germany

[21] Appl. No.: 09/242,311

[22] PCT Filed: Jun. 14, 1997

[86] PCT No.: PCT/DE97/01213

§ 371 Date: Feb. 12, 1999

§ 102(e) Date: Feb. 12, 1999

[87] PCT Pub. No.: WO98/07980

PCT Pub. Date: Feb. 26, 1998

[30] Foreign Application Priority Data

Aug. 17, 1996 [DE] Germany .................. 196 33 260

[51] Int. Cl.[7] ................................. F02M 61/00
[52] U.S. Cl. ............ 239/533.12; 239/453; 239/533.7; 239/533.9; 239/584; 239/590
[58] Field of Search ...................... 239/452, 453, 239/472, 473, 533.7, 533.9, 533.11, 533.12, 456, 584, 585.1, 590, 590.3, 590.5

[56] References Cited

U.S. PATENT DOCUMENTS

| | | | |
|---|---|---|---|
| 1,693,931 | 12/1928 | Lowe | 239/533.7 X |
| 2,656,218 | 10/1953 | Campbell . | |
| 4,350,301 | 9/1982 | Erwin et al. | 239/453 |
| 4,473,189 | 9/1984 | Itoh et al. | 239/453 |
| 4,651,931 | 3/1987 | Hans et al. | 239/533.12 X |
| 5,048,497 | 9/1991 | Kishida et al. | 239/585.1 X |
| 5,307,997 | 5/1994 | Wakeman . | |
| 5,878,961 | 3/1999 | Mueller et al. | 239/453 |

FOREIGN PATENT DOCUMENTS

| | | |
|---|---|---|
| 045 530 | 2/1982 | European Pat. Off. . |
| 32 01 044 | 7/1983 | Germany . |
| 32 10 209 | 9/1983 | Germany . |
| 38 20 509 | 12/1989 | Germany . |
| 2093118 | 8/1982 | United Kingdom . |
| WO 93/23172 | 11/1993 | WIPO . |
| WO 96/29514 | 9/1996 | WIPO . |

*Primary Examiner*—Andres Kashnikow
*Assistant Examiner*—Steven J. Ganey
*Attorney, Agent, or Firm*—Kenyon & Kenyon

[57] ABSTRACT

An injection valve is described, in particular for direct injection of fuel into a combustion chamber of an internal combustion engine, with a valve body having a valve opening surrounded by a valve seat to form a spray opening, and with a valve needle which is pressed into its closed position, has a closing head and extends through the valve opening so that the closing head which works together with the valve seat is in contact with the valve seat on the spray side when the valve is closed. To ensure accurate fuel metering that is constant over a long period of time with such an injection valve, a plurality of fuel channels distributed around the periphery are arranged in the flow path upstream from the spray opening so that streams or strands of fuel coming out of the fuel channels are essentially maintained until downstream from the spray opening, and the individual cross sections of the fuel channels (29, 29', 29") together define a cross section of the flow path through the valve which determines the flow rate.

25 Claims, 7 Drawing Sheets

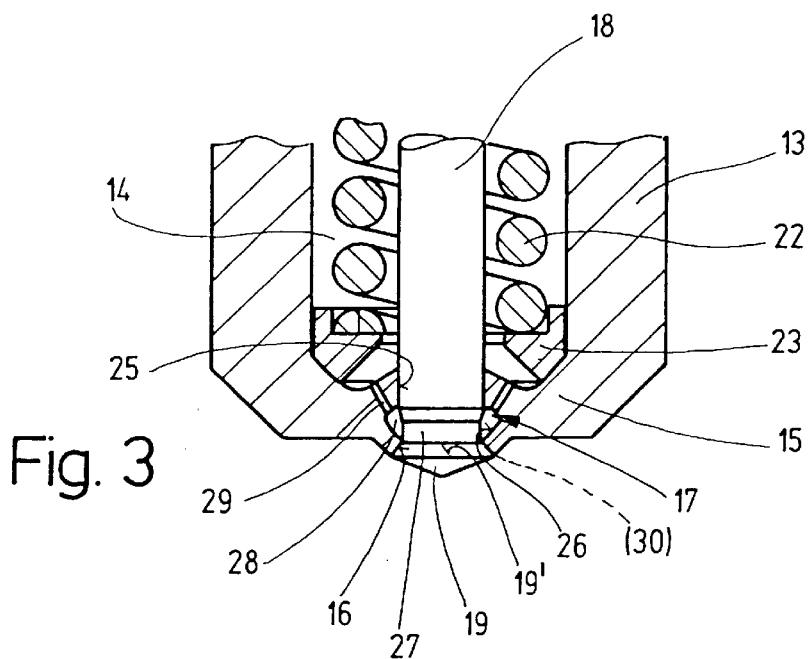
Fig. 3
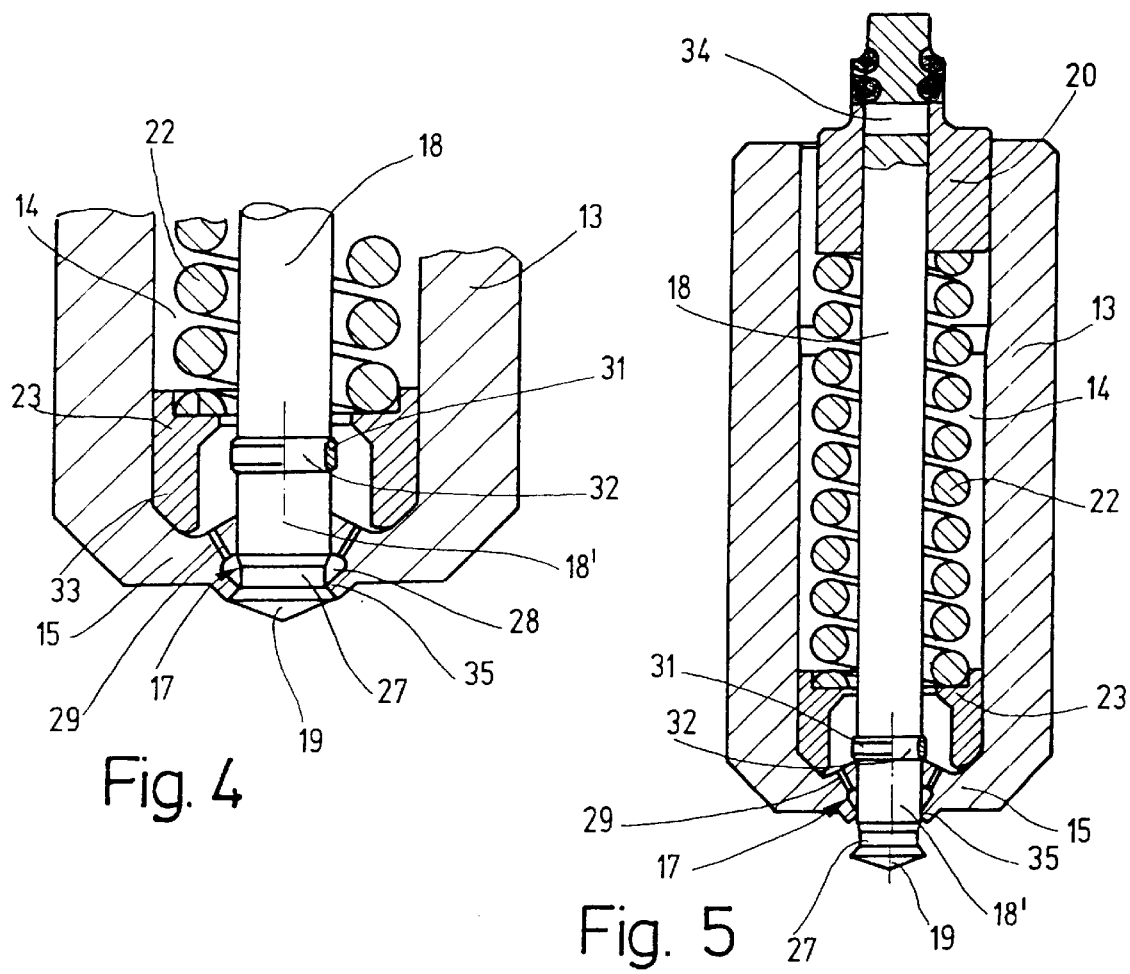
Fig. 4
Fig. 5

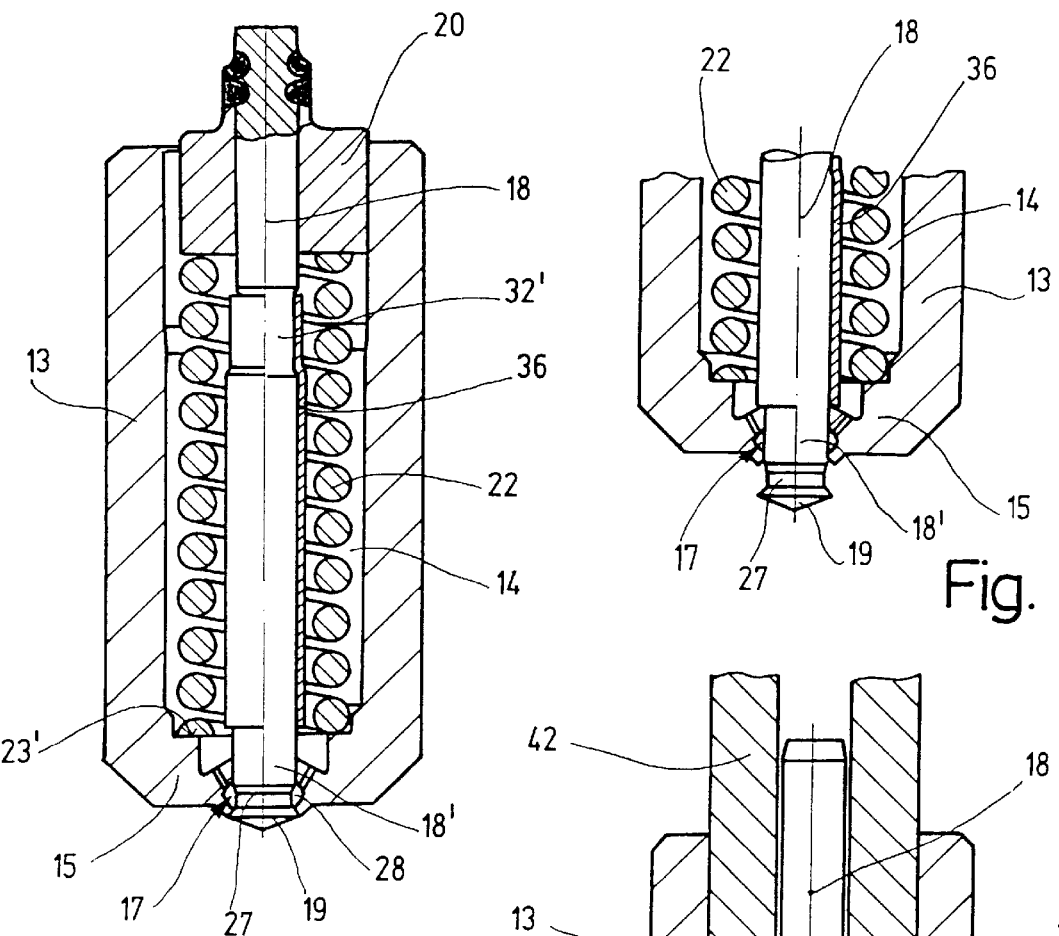
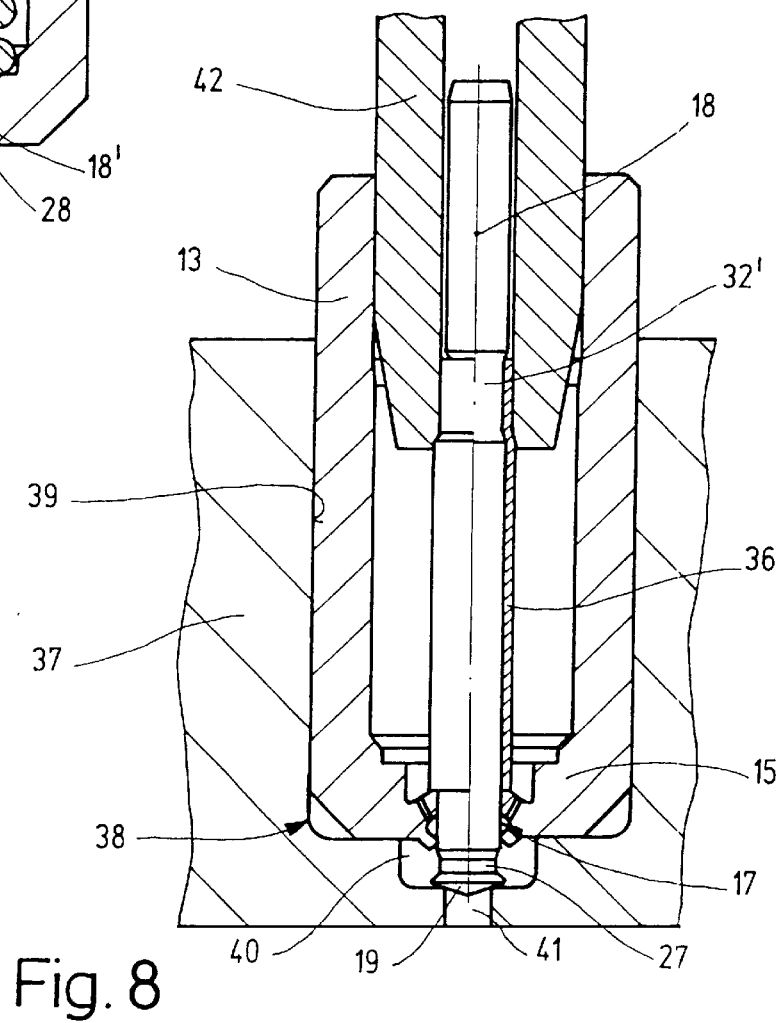
Fig. 6
Fig. 7
Fig. 8

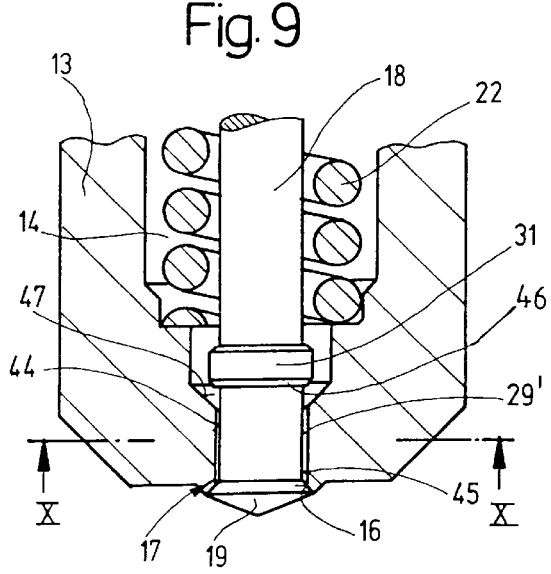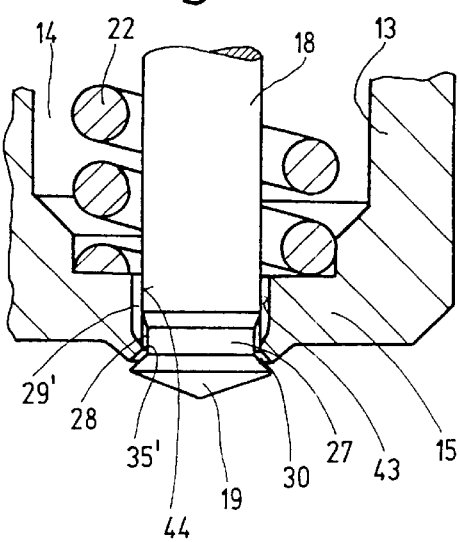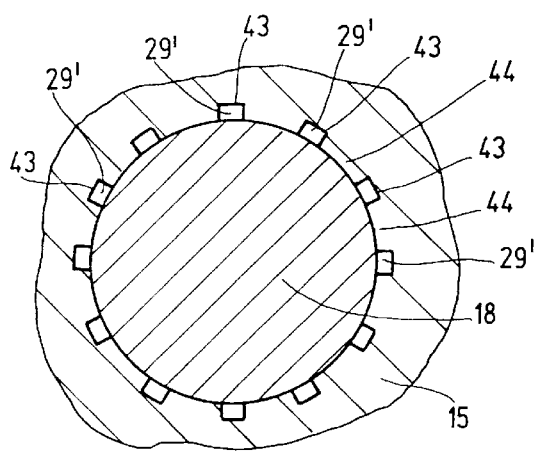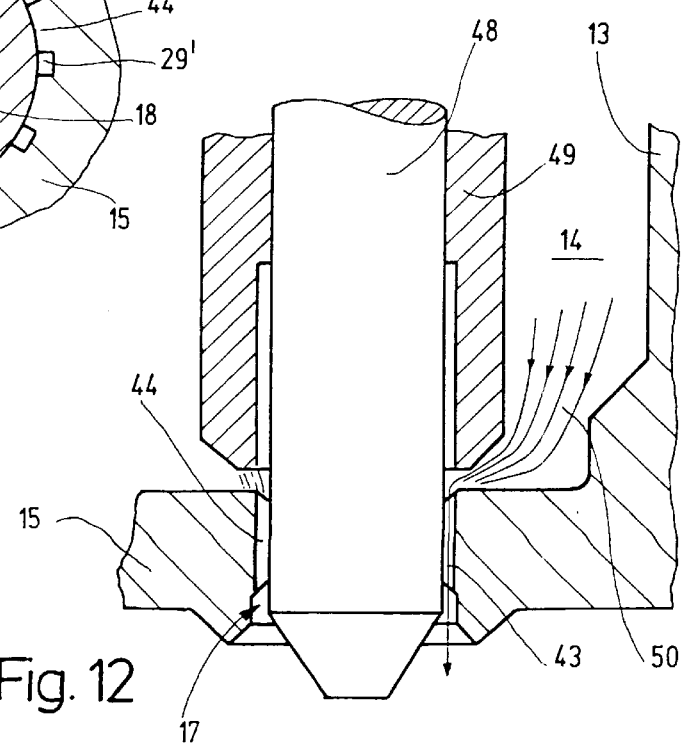

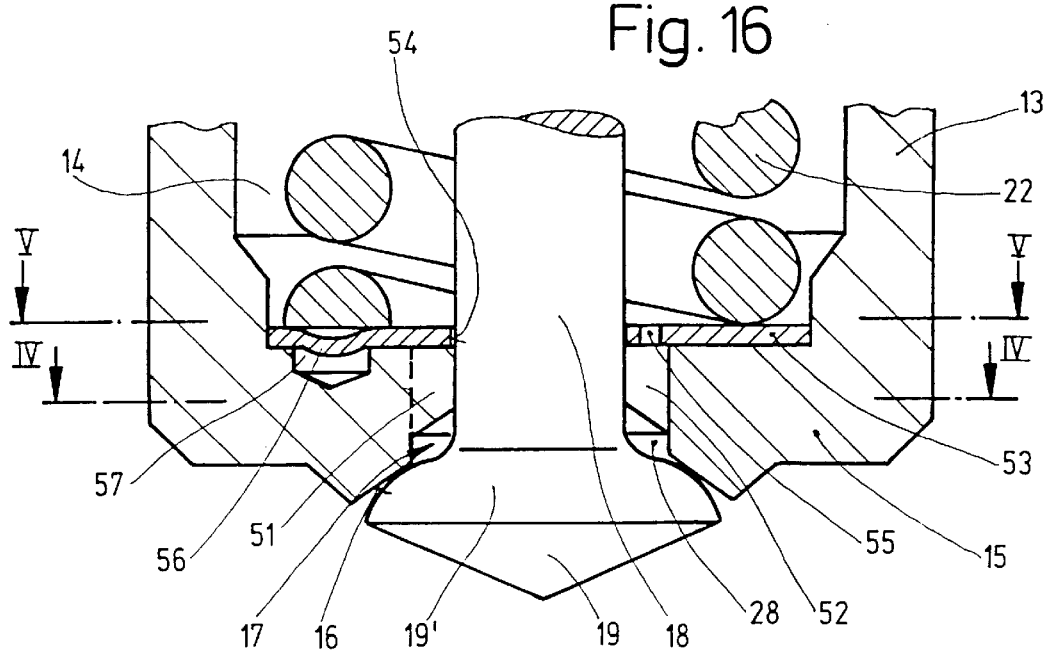
Fig. 16
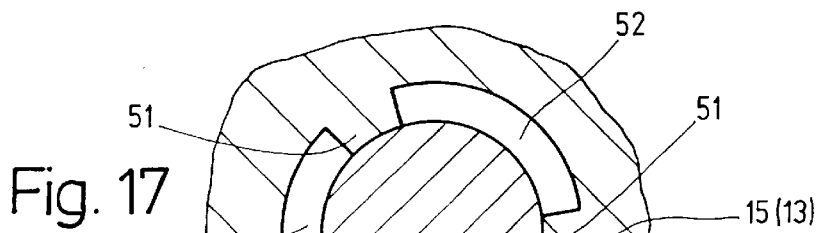
Fig. 17
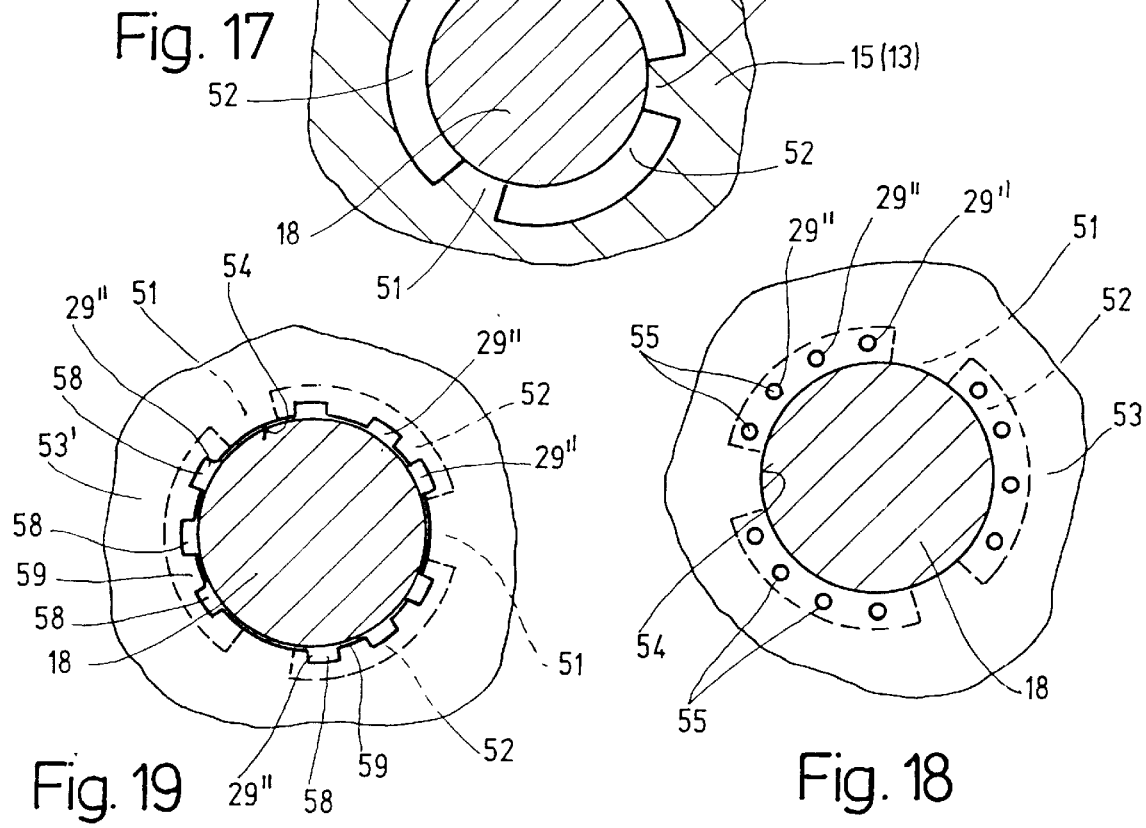
Fig. 19
Fig. 18

INJECTION VALVE, PARTICULARLY FOR DIRECT INJECTION OF FUEL INTO THE COMBUSTION CHAMBER OF AN INTERNAL COMBUSTION ENGINE

FIELD OF THE INVENTION

The present invention relates to an injection valve, in particular for direct injection of fuel into a combustion.

BACKGROUND INFORMATION

International Patent Publication No. WO 93/23172 describes a conventional injection valve for direct injection of fuel into the combustion chamber of an internal combustion engine includes a valve body arranged in a housing and having a valve opening which is surrounded by a valve seat arranged on the spray side and through which there extends a valve needle carrying a closing head so that the closing head is in contact with the valve seat from the outside when the valve is closed.

When the valve needle moves out of its closed position against the force of a closing spring into the spraying direction in order to spray fuel, the closing head is lifted up from the valve seat, forming an annular spray opening between the closing head and the valve seat. The cross section of the spray opening is the narrowest cross section of the flow path, determining the flow rate, through the valve and is determined by the opening stroke of the valve needle.

The opening stroke of the valve needle is determined by an actuating device acting on the valve needle, or if there are alignment errors, by a spring sleeve attached to the valve needle coming to rest against a valve needle guide body. Due to manufacturing tolerances, it is therefore difficult to accurately set the desired cross section of the spray opening. Furthermore, in prolonged operation of the known an injection valve, changes may occur in the cross section of the spray opening, because the means for limiting the stroke, as well as the valve seat and the sealing surface connected thereto, are subject to wear.

U.S. Patent No. 5,307,997 describes another conventional injection valve which includes a valve seat body with a valve opening serving as a spray opening and a valve needle guide body with as guide bore for the valve needle. A sealing surface provided on the valve needle is connected to a valve seat surrounding the valve opening on the side facing away from the spray area. Upstream of the spray opening there is a frusto-conical swirl chamber bordered by a recess in the valve seat body and a projection on the valve needle guide body.

Fuel is supplied to the swirl chamber through bore holes in the valve needle guide body which form fuel channels. Each individual bore hole has a bore section with a reduced diameter toward the outlet end. These bore sections together form the narrowest cross section in the flow path through the injection valve required for fuel metering. Because of the swirl chamber downstream from the fuel channels, fuel with this conventional injection valve is sprayed in the form of a uniform, continuous frusto-conical layer of fuel.

SUMMARY OF THE INVENTION

An exemplary embodiment of an injection valve according to the present invention has the advantage over the related art that the fuel channels which determine the narrowest flow cross section are protected from soiling, while on the other hand a stranded layer of fuel can be sprayed. The frusto-conical layer of fuel in particular thus has a fuel distribution that varies in the peripheral direction. It is therefore possible through a suitable design and arrangement of the fuel channels to optimize the fuel distribution in the fuel layer for the respective combustion chamber, so that a contiguous mist of fuel-air mix with a combustible fuel-to-air ratio can be produced.

Taking into account the built-in rotational position of the injection valve, the mutual arrangement of the spark plug and injection valve and the orientation of the injection valve with respect to the axis of the combustion chamber, it is thus possible achieve such results as no liquid fuel being deposited on the wall of the combustion chamber or on the piston bottom, the spark plug not cooling off too much due to being sprayed with fuel while a stoichiometric fuel-air mixture is present at the spark plug.

German Unexamined Patent Application No. 38 20 509 describes an injection nozzle with which diesel fuel is injected directly into a combustion chamber of a diesel engine. This injection nozzle has a valve body having a valve opening surrounded by a valve seat to form a spray opening. In addition, the spray nozzle has a valve needle which is pressed into its closed position, has a closing head and extends through the valve opening so that the closing head which works together with the valve seat is in contact with the valve seat on the spray side when the valve is closed. One or more edge grooves are provided on the downstream end of a valve sleeve in the flow path upstream from the spray opening.

This injection nozzle is designed so that the injection sequence is divided into several phases in which different flow paths in the nozzle are closed or opened so that different spray geometries are achieved in the individual phases. In a first phase of valve opening, the valve sleeve completes an axial movement together with the valve needle arranged in its inside opening. Since the valve sleeve has several longitudinal grooves running axially on its outside circumference, there can be a preinjection in this way. With another stroke of the valve needle, the longitudinal grooves are closed by the valve sleeve being inserted into the valve body while a control bore is opened in the valve sleeve, so that fuel can enter the inside of the valve sleeve between the latter and the valve needle. In this phase, string-like streams are produced as part of the main injection through the edge grooves. Subsequently, the valve sleeve comes to rest against a stop that is stationary with respect to the housing, while the valve needle moves further in the opening direction. Consequently, an annular gap is formed between the lower edge of the valve sleeve and the closing head, so that another portion of the main fuel spray enters the combustion chamber in the form of an umbrella stream under high pressure. With this arrangement, strands of fuel are produced in chronological succession by means of an axially movable valve sleeve and its opening geometry and are then subsequently replaced by an umbrella pattern of the fuel.

In particular when the fuel channels are implemented in the form of grooves, it is possible to reduce manufacturing cost without sacrificing precision in manufacturing. Using a metering disk having the fuel channels, which is assigned to the inflow area of the valve opening, results in particular in an especially inexpensive embodiment of the injection valve according to the present invention.

The safety of the injection valvel in operation can be improved through the stop means provided on the valve needle, because the valve needle is held fast in the valve opening when there is a valve needle break, and the injection valve is closed at the same time.

BRIEF DESCRIPTION OF THE DRAWINGS

FIG. 3 shows an enlarged diagram of the spray area of the valve unit according to FIG. 2.

FIG. 4 shows a section through the spray area of another valve unit.

FIG. 5 shows a section through the valve unit according to FIG. 4 with a broken valve needle.

FIG. 6 shows a section through another valve unit.

FIG. 7 shows a section through the spray area of the valve unit according to

FIG. 6 with a broken valve needle.

FIG. 8 shows a section through a device for attaching a securing tube on a valve needle.

FIG. 9 shows a section through the spray area of another valve unit.

FIG. 10 shows a section along the line X—X in FIG. 9.

FIG. 11 shows a section through the spray area of yet another valve unit.

FIG. 12 shows a section through a device for adjusting the flow resistance of fuel channels designed as grooves.

FIG. 16 shows a section through the spray area of yet another valve unit.

FIG. 17 shows a section along the line IV—IV in FIG. 16

FIG. 18 shows a section along the line V—V in FIG. 16.

FIG. 19 shows a section, similar to the section shown in FIG. 18, through another exemplary embodiment of the valve unit according to FIG. 16.

DETAILED DESCRIPTION

Figure 1:
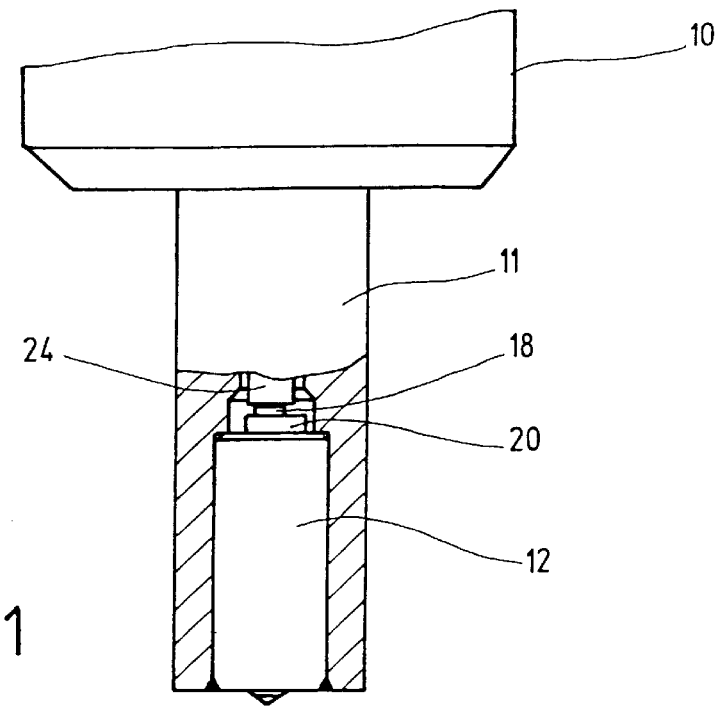
FIG. 1 shows a partially cutaway view of an exemplary embodiment of an injection valve according to the present invention.
Figure 2:
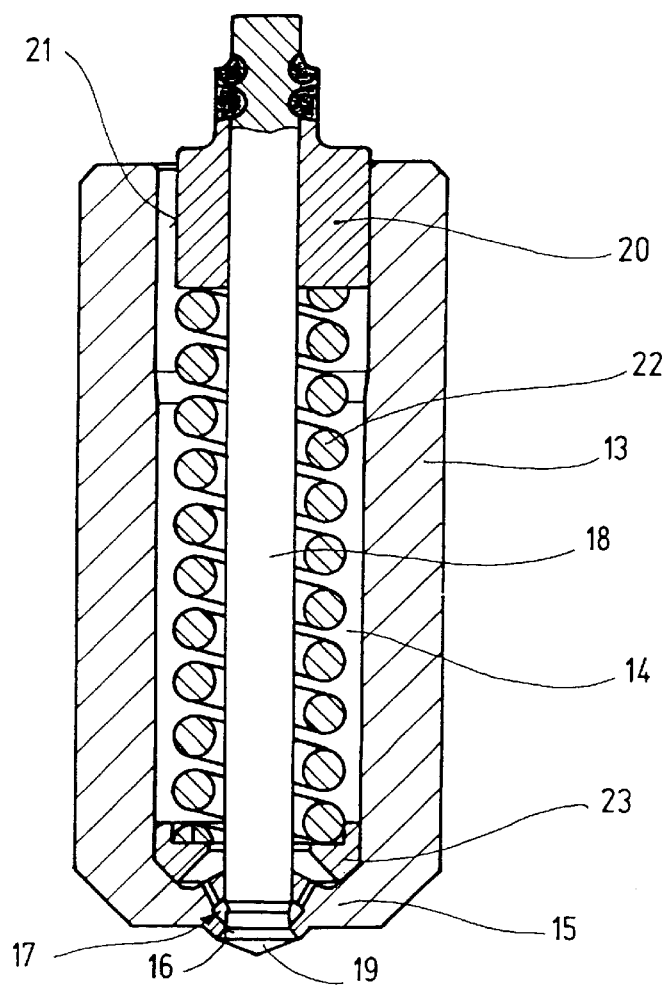
FIG. 2 shows a section through a valve unit of the injection valve.

As FIG. 1 shows, the injection valve according to the present invention has a valve housing 10 with an outlet tube 11 into which a valve unit 12 is tightly inserted. As shown in FIG. 2, valve unit 12 includes. a valve body 13 with a spring space 14 which is bordered by a bottom 15 on the spray side. A valve opening 17 surrounded by a valve seat 16 arranged on the spray side is provided in bottom 15, with a valve needle 18 passing through the valve opening.

Valve needle 18, which has a closing head 19 working together with valve seat 16 and guided in valve opening 17 in the area of its closing head 19, extends through spring space 14 and is permanently connected. at its end facing away from closing head 19 to a guide bush 20 guided in spring space 14. Guide bush 20 has a recess 21 extending over its axial length, e.g., a flattened area designed as a ground planar section or one or more grooves, so that fuel can flow into spring space 14.

A closing spring 22 which presses valve needle 18 into its closed position is arranged on valve needle 18 between guide bush 20 and a bearing ring 23 in contact with bottom 15. An actuating device (not shown) is provided for opening the injection valve; as indicated in FIG. 1, this actuating device acts on valve needle 18 by way of an impact part 24, moving the valve needle against the force of closing spring 22 into its open position.

As shown in FIG. 3, valve opening 17 encloses a guide section 25 and a peripheral groove 26 provided between guide section 25 and valve seat 16 surrounding valve opening 17. However, groove 26 can also be omitted, so that guide section 25 of valve opening 17 extends as far as valve seat 16.

Next to a sealing face 19' which is provided on closing head 19 of valve needle 18 and works together with valve seat 16, a peripheral groove 27 is provided on valve needle 18, bordering together with groove 26 an annular space 28 upstream from valve seat 16. If groove 26 of valve opening 17 is omitted, annular space 28 is bordered by groove 27 on valve needle 18 and the part: of guide section 25 that is in the area of groove 27.

Fuel channels 29 designed as bore holes provided in bottom 15 of valve body 13 are distributed around guide section 25 and, running obliquely to valve needle 18, open into annular space 28. Individual fuel channels 29 each have a defined cross section so that together they define a narrowest cross section in the flow path through the injection valve, determining the flow rate.

To inject fuel directly into a combustion chamber of an internal combustion engine with such an injection valve, valve needle 18 is moved from its closed position into its open position. In doing so, an annular spray opening 30 is formed between valve seat 16 and sealing face 19'. Thus, when the injection valve is open, fuel flows out of spring space 14 through fuel channels 29 into annular space 28 and further on to spray opening 30, through which the fuel is then sprayed.

A plurality of fuel streams or strands are produced by individual fuel channels 29. The individual fuel streams or strands are deflected by sealing face 19' at valve needle 18, creating an essentially frusto-conical fuel film or mist in the spray area of the injection valve, i.e., in the respective combustion chamber. The fuel streams are essentially preserved in flowing through annular space 28 and spray opening 30, so that a stranded fuel distribution exists in the sprayed fuel film.

To influence the fuel distribution in the fuel film, the individual fuel channels 29, the number of which may amount to about 5 to 20, may be spaced uniformly around the periphery or have different, precisely defined peripheral spacings. In addition, it is possible for individual fuel channels 29 to be provided with a larger or smaller cross section so that the thickness of the individual fuel strands of the fuel films differs. Fuel channels 29 have diameters in the range of 0.05 mm to 0.2

The bore holes forming fuel channels 29 are produced by electrical discharge machining or by laser boring. To set the common flow resistance of fuel channels 29 precisely at a predetermined level, fuel channels 29 are machined by hydroerosion in particular. To do so, valve opening 17 is closed in the area of its guide section 25, and liquid abrasive is pumped under high pressure through fuel channels 29 until the desired flow resistance is achieved. In this machining, the inlet-side edges of fuel channels 29 become rounded, which reduces the flow resistance.

Injection valves in which valve needle 18 passes through valve opening 17, with its closing head 19 in contact with valve seat 16 on the spray side when the valve is closed, have the advantage that the individual elements for fuel metering and fuel distribution in the fuel film are completely separated from the unclean combustion chamber atmosphere when the valve is closed, so that no impurities which could impair the injection function can be deposited on them.

In the event of breakage of valve needle 18, in order to prevent the broken-off part of valve needle 18 from being forced through valve opening 17 into the combustion chamber under the pressure of fuel in spring space 14, it is advantageous to provide stop means on valve needle 18 that work together with a counterstop provided for valve opening 17, so that movement of valve needle 18 is limited in the direction of spraying without impairing the opening stroke of valve needle 18 required for trouble-free operation of the injection valve.

As FIG. 4 shows, a securing ring 31, which is arranged in a peripheral groove 32 on valve needle 18, may be provided as such a stop means. To prevent securing ring 31 from interfering with normal operation of the injection valve, bearing ring 23 has an axial flange 33 for closing spring 22, with bearing ring 23 being supported with said flange on bottom 15 of valve body 13.

If a valve needle break occurs, e.g., a crack 34 in valve needle 18 close to its attachment to guide bush 20, then as shown in FIG. 5, the broken-off part of valve needle 18 is pushed through valve opening 17 in the direction of spraying until securing ring 31 comes to rest against bottom 15 in the peripheral area of valve opening 17. Bottom 15 of valve body 13 thus serves as a counterstop for securing ring 31.

The length of the displacement path of valve needle 18 allowed by securing ring 31 is greater than the axial distance of the upstream edge of groove 27 from closing head 19. Thus valve needle 18 with its section 18' which is located between groove 27 and securing ring 31 and is normally guided in guide section 25 of valve opening 17 may extend into a section of valve opening 17 directly next to valve seat 16 and thus tightly seal valve opening 17. The section of valve opening 17 upstream from valve seat 16 may be formed by a collar 35 between valve seat 16 and groove 26 or, if there is no groove 26, by guide section 25. Collar 35 has the same inside diameter as guide section 25.

In this way, in the event of a valve needle break, it is possible not only to prevent fragments of valve needle 18 from entering the combustion chamber and causing engine damage there but also to prevent fuel from coming out of a damaged injection valve.

In another embodiment of the present invention, as shown in FIGS. 6 and 7, a securing tube 36 is arranged on valve needle 18. Closing spring 22 is supported on a shoulder 23' formed on bottom 15.

To fasten securing tube 36, a peripheral groove 32' is provided on valve needle 18 close to guide bush 20, and securing tube 36 is pressed into this groove with its end facing away from closing head 19.

The use of a securing tube 36 simplifies the assembly of the injection valve, because it can be mounted easily and accurately on valve needle 18, independently of manufacturing tolerances.

For simple assembly of securing tube 36, a fastening device 37 is used to advantage, having a stepped bore 38, as shown in FIG. 8, with a locating area 39 for valve body 13 and a section 40 next to that for the end of valve needle 18 having closing head 19. A central opening 41 whose edge forms an adjusting stop for closing head 19 follows section 40.

To attach securing tube 36 on valve needle 18 valve needle 18 is first inserted into valve opening 17. Valve body 13 prepared in this way is then inserted into locating area 39 of fastening device 37. Valve needle 18 is then pushed out through valve opening 17 into section 40 of stepped bore 38 until closing head 19 comes to rest on the edge of opening 41. Then securing tube 36 is pushed onto valve needle 18 until its one end abuts against bottom 15 in the area of valve opening 17. The other end of securing tube 36 is then next to its edge facing away from closing head 19 by way of groove 32'.

Then the end of securing tube 36 facing away from closing head 19 can be pressed with the help of a tubular ram 42 into groove 32' so that it is secured on valve needle 18.

In another embodiment of the present invention illustrated in FIGS. 9 and 10, grooves 43 are provided in the wall of valve opening 17 with guide webs 44 for valve needle 18 formed between them. Guide webs 44 end at a distance from valve seat 16, thus forming an annular space 45 between the enlarged section of valve opening 17 and valve needle 18. Grooves 43 together with valve needle 18 then define fuel channels 29' opening into annular space 45. However, grooves 43 may also extend into the area of valve seat 16.

To achieve a desired fuel distribution in the sprayed fuel film, the number of grooves 43 forming fuel channels 29', their free cross section, their shape (round, rectangular, deep or wide) and their peripheral distribution may be varied, as may also the respective sizes of fuel channels 29 formed by bore holes. It is also possible to design grooves 43 to be helical in order to impart a swirl to a sprayed fuel film.

To ensure that in the event of a valve needle break in such an injection valve, not only will valve needle 18 be retained in valve opening 17 but also valve opening 17 will be closed, securing ring 31 is provided with a chamfer 46 with which securing ring 31 abuts against a conical stop face 47 surrounding valve opening 17 in the event of a valve needle break, thereby sealing valve opening 17. Securing ring 31 is made of a polymer material to advantage, so that an especially reliable seal of valve opening 17 is achieved in the event of a valve needle break.

With the injection valve shown in FIG. 11, grooves 43 forming fuel channels 29' end at a distance from valve seat 16. A collar 35' is provided here between the spray end of grooves 43 and valve seat 16, its diameter corresponding to the guide diameter of valve opening 17 in the area of guide webs 44. To form an annular space 28, a peripheral groove 27 is provided on valve needle 18 directly next to closing head 19.

This makes it possible to achieve a valve seat diameter only slightly larger than the diameter of valve opening 17, thus minimizing the surface exposed to the fuel pressure in the injection valve and the combustion chamber pressure. This has the advantage that lower forces are sufficient to move valve needle 18. Thus the actuating device can also be designed smaller accordingly. In particular, this makes it possible to use smaller electromagnets for the actuating device, so the injection valve is smaller and more compact on the whole.

When valve needle 18 is pushed into its open position shown in FIG. 11, this results in a flow path from spring space 14 through fuel channels 29' to annular space 28 and further to annular spray opening 30, which is delimited by valve seat 16 and sealing face 19' on closing head 19 of valve needle 18.

A special advantage of fuel channels 29' formed by grooves 43 is that they can be manufactured more quickly because two diametrically opposed grooves 43 can be produced at the same time using a flat eroding electrode.

This also has the advantage that a higher precision can be achieved in manufacturing because flat eroding electrodes are stiffer than wire electrodes used to produce bore holes.

The overall flow resistance of fuel channels 291 formed by grooves 43 can be adjusted to particular advantage with an electrochemical machining method. As shown in FIG. 12, valve opening 17 is sealed for this purpose by an insulating pin 48, which is made of ceramic, for example, in the area between guide webs 44. Then a tubular electrode 49 is placed on insulating pin 48 and brought into the inflow area of grooves 43. Then an electrolyte is pumped through spring space 14 and grooves 43, as indicated by arrows 50. The flow resistance achieved in each case can be measured easily during the electrochemical rounding of the inlet areas of grooves 43. To do so, the static flow rate of electrolyte can be determined at a constant pump pressure, for example.

Figure 13:
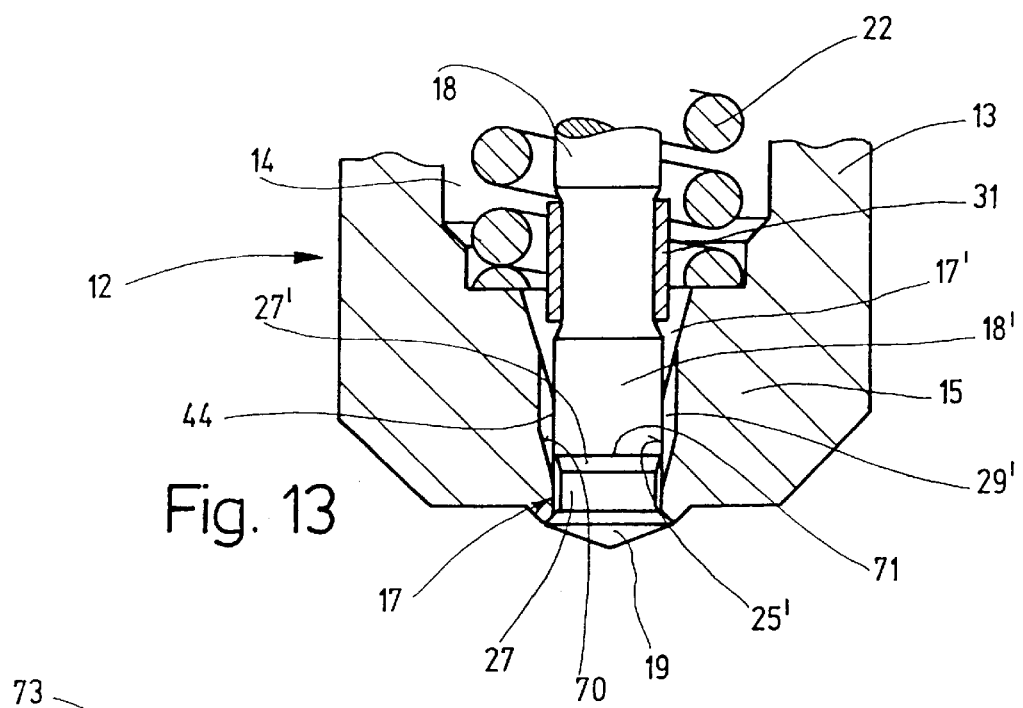
FIG. 13 shows a section through the spray area of yet another valve unit.

In the case of valve unit 12 according to FIG. 13, valve opening 17 has a conical section 17' on the inlet side, followed by a guide section 25' in the direction of valve seat 16. In the area of guide section 25', axial grooves are provided as fuel channels 29' with guide webs 44 between them. Fuel channels 29' have inclined faces 70, running at an inclination at their outlet end and ending at a distance upstream from valve seat 16, thus forming a peripheral collar 35'. The angles between inclined faces 70 and the valve needle axis and between conical section 17' and the valve needle axis are approximately the same.

Valve needle 18 has a peripheral groove 27 next to its closing head 19, developing into a cylindrical section 18' by way of conical face 27' on the side facing away from closing head 19, thus forming a peripheral edge 71 on valve needle 18 lying in the area of inclined faces 70 of fuel channels 29'. The angle between conical face 27' and the valve needle axis is greater than the angles between inclined faces 70 and the valve needle axis or between conical section 17' and the valve needle axis.

When valve needle 18 is pushed into its open position during the operation of the injection valve according to the present invention, the narrowest cross section of the flow path through the injection valve is between edge 71 and inclined faces 70 of fuel channels 29'.

If a valve needle breaks, valve opening 17 is closed by cylindrical section 18' of valve needle 18 which is pushed into the area of collar 35', while securing ring 31 prevents valve needle 18 from being forced completely out of valve body 13.

Figure 14:
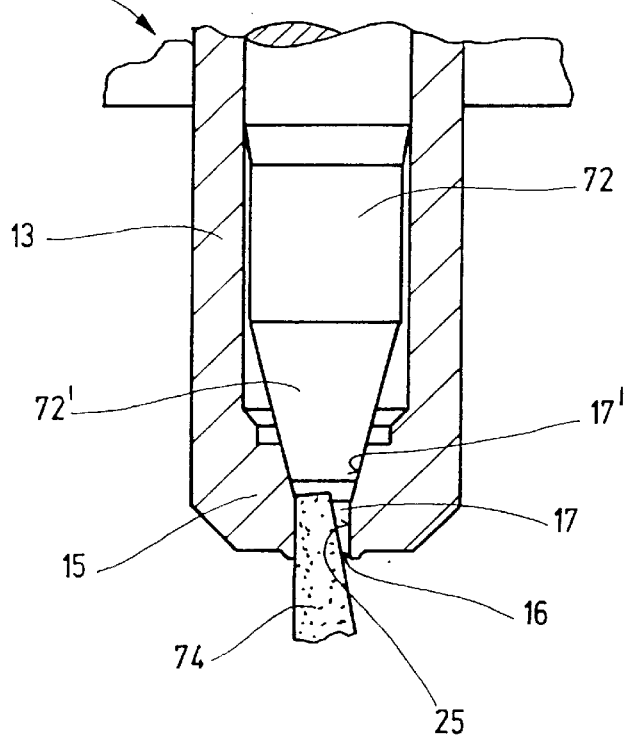
FIG. 14 shows a section through a device for grinding a guide section for a valve needle in the valve body of the valve unit according to FIG. 13.

As shown in FIG. 14, valve body 13 is arranged on a locating mandrel 72 of a fastening device 73 after forming conical section 17' of valve opening 17. Locating mandrel 72 has a conical tip 72' whose cone angle corresponds to the cone angle of conical section 17'. As soon as valve body 13 is arranged in the manner described here, guide section 25' and valve seat 16 can be ground. FIG. 14 shows a grinding tool 74 for grinding the guide section.

Due to the arrangement of valve body 13 with conical section 17' of valve opening 17 on the locating mandrel 72 of fastening device 73, radial eccentricities between conical section 17' and guide section 25' can be minimized.

Figure 15:
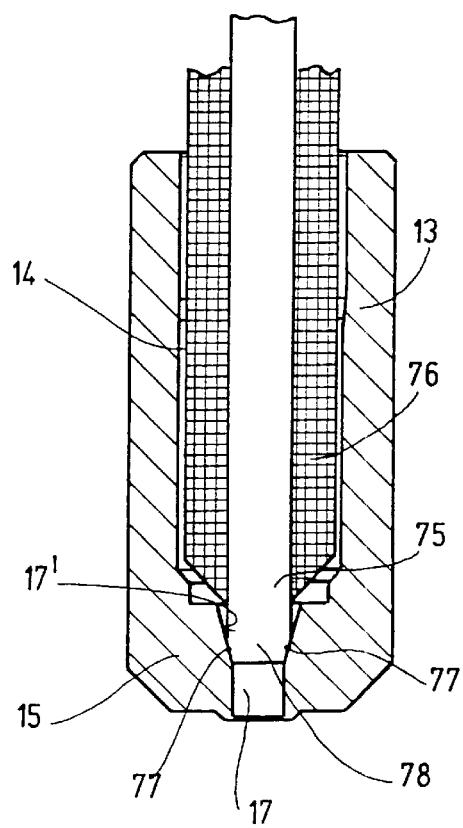
FIG. 15 shows a section through a device for eroding fuel channels designed as grooves in the valve body of the valve unit according to FIG. 13.

To produce fuel channels 29', an eroding electrode 75 is first inserted together with its electrode guide 76 into spring space 14 of valve body 13, as shown in FIG. 15.

Then eroding electrode 75 is adjusted to conical section 17' of valve opening 17 by reversing the polarity of the eroding current so that the inclination of side edges 77 of eroding electrode tip 78 corresponds to the inclination of conical section 17'. Then fuel channels 29' are eroded.

The symmetry of inclined faces 70 of fuel channels 29' with respect to guide section 25' is very accurate due to the adjustment of eroding electrode 75 to conical section 17'. This also yields a very accurate symmetry of the sprayed streams of fuel.

If the fuel flow through the injection valve according to the present invention is to be increased at a given stroke of valve needle 18 and set at a predetermined value, this can be achieved easily by grinding conical face 27' delimiting groove 27.

With another injection valve according to the present invention as shown in FIGS. 16, 17 and 18, valve opening 17 has guide webs 51 distributed peripherally in bottom 15 of valve body 13, forming fuel flow areas 52 between the webs, developing into an annular space 28 upstream from valve seat 16. A metering disk 53 having a central opening 54 through which valve needle 18 passes and having a plurality of metering orifices 55 which form fuel channels 29" sits on bottom 15 of valve body 13 and is held in contact with bottom 15 by closing spring 22.

As FIG. 18 shows, individual metering orifices 55 are combined into groups and assigned to individual fuel flow areas 52 of valve opening 17. In its contact area, metering disk 53 has a projection 56 which extends toward bottom 15 of valve body 13 and may be formed by a depression or recess, for example, in metering disk 53 so that it engages or locks in a recess 57 in bottom 15. Due to the interaction of recess 57 with projection 56, the rotational position of metering disk 53 relative to valve body 13 is fixed, so that the individual metering orifices 55 are reliably assigned in the desired manner to fuel flow areas 52.

In another embodiment of metering disk 53' (FIG. 19), fuel channels 29" are formed by groove-like recesses 58 in the edge of central opening 54 between which webs 59 are provided.

With this injection valve according to the present invention, valve unit 12 can be manufactured especially inexpensively, because precision manufacturing of metering disk 53, 53' is possible and can be performed simply. For example, metering disk 53, 53' may be punched or cut out by spark erosion machining or laser cutting. Furthermore, it is possible to manufacture metering disk 53, 53' by electrochemical deposition or electrochemical abrasion.

Figure 20:
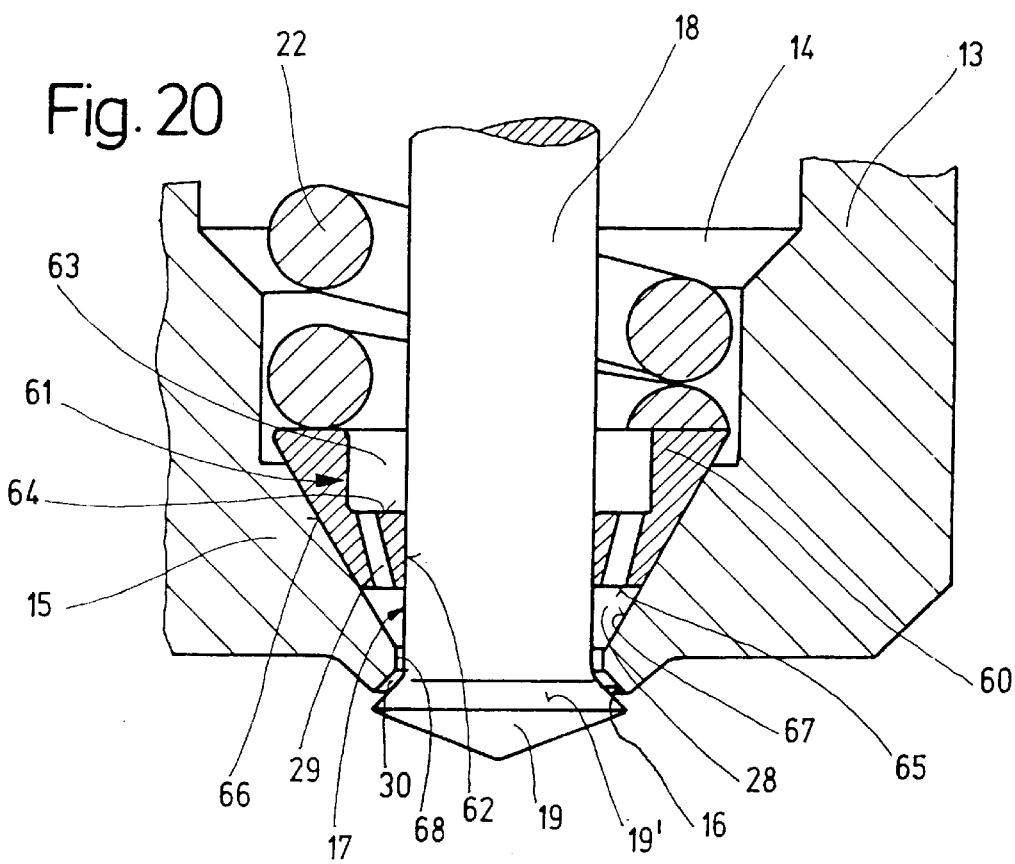
FIG. 20 shows a section through another valve unit with a guide body for a valve needle.

In another injection valve according to the present invention, as shown in FIG. 20, a guide body 60 is provided for valve needle 18, having a centraL bore 61 with a guide section 62 and an enlarged area 63 facing spring space 14. Bores forming fuel channels 29 extend from a shoulder 64 between enlarged area 63 and guide section 62 to an end face 65 of guide body 60 facing valve seat 16, and they open into annular space 28 which is formed between guide body 60 and valve seat 16 in valve opening 17.

Guide body 60 which is forced by closing spring 22 into valve opening 17 preferably has a conical outside peripheral surface 66 with which it is in contact with a corresponding inside peripheral surface 67 of valve opening 17. Inside peripheral surface 67 of valve opening 17 ends at a distance upstream from valve seat 16, thus forming a collar 68 in the area of which the diameter of valve opening 17 is larger than the diameter of valve needle 18.

With this embodiment, conical inside peripheral surface 67 of valve opening 17 can be ground together with valve seat 16 in one chucking, so that inside peripheral surface 67 and valve seat 16 have very little radial eccentricity. Similarly, central bore 61, the bores for fuel channels 29 and conical outside peripheral surface 66 on guide body 60 can be manufactured in one chucking with very little radial eccentricity. Thus, guide section 62 for valve needle 18 and valve seat 16 can be aligned very accurately with one another when valve unit 12 is assembled.

When the injection valve described on the basis of FIG. 20 is opened to spray a fuel film, fuel flows from spring space 14 through enlarged area 63 of central bore 61 and fuel channels 29 into annular space 28 and past collar 68 to annular spray opening 30 which opens between valve seat 16 and sealing face 19' when closing head 19 is lifted from valve seat 16. The fuel streams or strands coming out of the fuel channels are essentially maintained.

Figure 21:
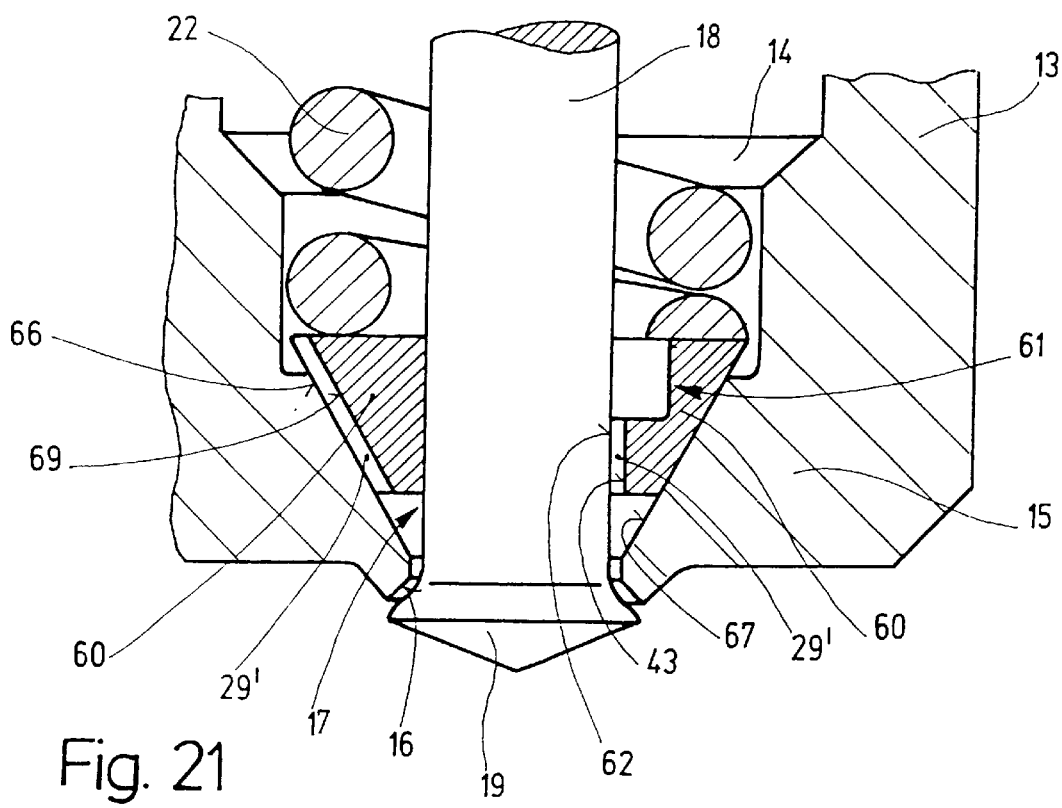
FIG. 21 shows a section through a valve unit according to FIG. 20 with another guide body.

As shown in FIG. 21, guide body 60 may be provided with grooves 69 or 43 to form fuel channels 29' on its outside peripheral surface 66 (left half of FIG. 21) or in guide section 62 of central bore 61 (right half of FIG. 21).

The advantage of the design of grooves 69 forming fuel channels 29' in outside peripheral surface 66 of guide body 60 is that fuel channels 29' can be manufactured especially easily and accurately.

The design of fuel channels 29' in guide section 62 yields an especially favorable guidance of the fuel flow through the injection valve.

What is claimed is:

1. A fuel injection valve, comprising:
   a valve seat;
   a valve body including a valve opening, the valve opening being surrounded by the valve seat to form a spray opening;
   a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and
   a plurality of fuel channels distributed around a periphery of the valve body and situated in a flow path upstream from the spray opening, the fuel channels having cross sections which define a flow-path cross-section through the injection valve, the flow-path cross-section determining a flow rate of a fuel, the fuel channels and the valve opening configured to maintain the fuel in streams or strands as the fuel emerges from the fuel channels until downstream from the spray opening, the fuel channels being situated directly in the valve body upstream from the valve seat.

2. The injection valve according to claim 1, wherein the injection valve directly injects the fuel into a combustion chamber of an internal combustion engine.

3. The injection valve according to claim 1, wherein the fuel channels open into an annular space, the annular space surrounding the valve needle and being provided in the valve opening upstream from the spray opening.

4. The injection valve according to claim 1, wherein the fuel channels are bore holes.

5. A fuel injection valve, comprising:
   a valve seat;
   a valve body including a valve opening, the valve opening being surrounded by the valve seat to form a spray opening;
   a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle;
   a plurality of fuel channels distributed around a periphery of the valve body and situated in a flow path upstream from the spray opening, the fuel channels having cross sections which define a flow-path cross-section through the injection valve, the flow-path cross-section determining a flow rate of a fuel, the valve opening maintaining streams or strands of the fuel, emerging from the fuel channels, until downstream from the spray opening, the fuel channels being situated directly in the valve body upstream from the valve seat; and
   a guide section including the fuel channels, the guide section guiding the valve needle in an area of the closing head.

6. A fuel injection valve, comprising:
   a valve seat;
   a valve body including a valve opening, the valve opening being surrounded by the valve seat to form a spray opening;
   a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and
   a plurality of fuel channels distributed around a periphery of the valve body and situated in flow path upstream from the spray opening, the fuel channels having cross sections which define a flow-path cross-section through the injection valve, the flow-path cross-section determining a flow rate of a fuel, the valve opening maintaining streams or strands of the fuel, emerging from the fuel channels, until downstream from the spray opening, the fuel channels being situated directly in the valve body upstream from the valve seat;
   wherein the fuel channels are grooves in a wall of the valve opening which guides the valve needle.

7. The injection valve according to claim 6, wherein the grooves include end inclined faces at an outlet portion, the end inclined faces and an edge of the valve needle defining the flow-path cross-section.

8. The injection valve according to claim 7, wherein the wall includes a conical section at an inlet end, the conical section forming a first angle with an axis of the valve needle, the end inclined faces forming a second angle with the axis, the first angle being equal to the second angle.

9. A fuel injection valve, comprising:
   a valve seat;
   a valve body including a valve opening, the valve opening being surrounded by the valve seat to form a spray opening;
   a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and
   a plurality of fuel channels distributed around a periphery of the valve body and situated in a flow path upstream from the spray opening, the fuel channels having cross sections which define a flow-path cross-section through the infection valve, the flow-path cross-section determining a flow rate of a fuel, the valve opening maintaining streams or strands of the fuel, emerging from the fuel channels, until downstream from the spray opening, the fuel channels being situated directly in the valve body upstream from the valve seat;

wherein the fuel channels open into an annular space, the annular space surrounding the valve needle and being provided in the valve opening upstream from the spray opening; and wherein a diameter of the valve opening in a first area corresponds to a guide diameter for the valve needle, the first area positioned directly upstream from the valve seat, the valve needle including a peripheral groove delimiting the annular space on an inside wall of the valve needle which is next to the closing head.

10. The injection valve according to claim 9, wherein the wall includes a peripheral groove, the peripheral groove delimiting the annular space on an outside wall so that the valve opening includes a collar between the peripheral groove and the valve seat.

11. A fuel injection valve, comprising:

a valve seat;

a valve body including a valve opening, the valve opening being surrounded by the valve seat to form a spray opening;

a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and a member including a plurality of fuel channels, the fuel channels being situated upstream from the valve seat separately from the valve body, the fuel channels being distributed around a periphery and situated in a flow path upstream from the spray opening, the fuel channels having cross sections which define a flow-path cross-section through the injection valve, the flow-path cross-section determining a flow rate of a fuel, the valve opening maintaining streams or strands of the fuel, emerging from the plurality of fuel channels, until downstream from the spray opening, the member being permanently connected to the valve body.

12. The injection valve according to claim 11, wherein the injection valve directly injects the fuel into a combustion chamber of an internal combustion engine.

13. The injection valve according to claim 11, wherein the fuel channels open into an annular space which surrounds the valve needle, the annular space being provided in the valve opening upstream from the spray opening.

14. The injection valve according to claim 11, wherein the fuel channels are bore holes.

15. The injection valve according to claim 11, further comprising:

a metering disk including the fuel channels and a central opening for the valve needle, the metering disk being used for an inlet area of the valve opening.

16. The injection valve according to claim 15, wherein metering orifices of the metering disk form the fuel channels.

17. The Injection valve according to claim 15, wherein recesses in an edge of the central opening form the fuel channels.

18. The injection valve according to claim 15, wherein fuel flow areas extend axially in the valve opening and are situated between guide webs for the valve needle, a part of the fuel channels being assigned to the fuel flow areas.

19. A fuel injection valve, comprising:

a valve seat;

a valve body including a valve opening, the valve opening being surrounded by the valve seat to form a spray opening;

a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and a member including a plurality of fuel channels, the fuel channels being situated upstream from the valve seat separately from the valve body, the fuel channels being distributed around a periphery and situated in a flow path upstream from the spray opening, the fuel channels having cross sections which define a flow-path cross-section through the injection valve, the flow-path cross-section determining a flow rate of a fuel, the valve opening maintaining streams or strands of the fuel, emerging from the plurality of fuel channels, until downstream from the spray opening, the member being permanently connected to the valve body;

wherein the member further includes a conical guide body, the conical guide body being inserted, as a guide part for the valve needle, into the valve opening, the valve opening having a conical section.

20. The injection valve according to claim 19, wherein the fuel channels are grooves in a conical outside peripheral surface of the conical guide body.

21. A fuel injection valve comprising:

a valve seat;

a valve body including a valve opening, the valve opening being surrounded by the valve seat to form a spray opening;

a valve needle including a closing head which cooperates with the valve seat, the valve needle being prestressed into a closed position, wherein when the valve needle is in the closed position, the valve needle extends through the valve opening to enable the closing head to contact the valve seat on a spray side of the valve needle; and a plurality of fuel channels distributed around a periphery of the valve body and situated in a flow path upstream from the spray opening, the fuel channels having cross sections which define a flow-path cross-section through the injection valve, the flow-path cross-section determining a flow rate of a fuel, the valve opening maintaining streams or strands of the fuel, emerging from the fuel channels, until downstream from the spray opening, the fuel channels being situated directly in the valve body upstream from the valve seat;

a stop arrangement positioned on the valve needle; and a counterstop cooperating with the stop arrangement, the counterstop being situated at the valve opening to limit movement of the valve needle in a spray direction, wherein, when the valve needle is in the closed positioned, a particular distance between the stop arrangement and the counterstop is greater than an opening stroke of the valve needle.

22. The injection valve according to claim 21, wherein the stop arrangement is retained in a groove of the valve needle.

23. The injection valve according to claim 21, further comprising:

a securing ring including the stop arrangement.

24. The injection valve according to claim 23, wherein the securing ring is composed of a polymer material.

25. The injection valve according to claim 21, further comprising:

a securing tube including the stop arrangement.

* * * * *

UNITED STATES PATENT AND TRADEMARK OFFICE
CERTIFICATE OF CORRECTION

PATENT NO. : 6,155,499
DATED : December 5, 2000
INVENTOR(S) : Rembold et al.

Page 1 of 1

It is certified that error appears in the above-identified patent and that said Letters Patent is hereby corrected as shown below:

Abstract,
Line 16, delete "... (29, 29'".
Line 17, delete "29")...".

Column 1,
Line 9, after " ... combustion" insert -- engine --.

Column 2,
Line 63, change "... valvel ..." to -- valve --.

Column 4,
Line 21, change "... part: ..." to -- part --.

Column 8,
Line 50, change "... centraL ..." to -- central --.

Column 10,
Line 64, change "... infection ..." to -- injection --.

Signed and Sealed this

Thirtieth Day of October, 2001

Attest:

NICHOLAS P. GODICI
Attesting Officer
Acting Director of the United States Patent and Trademark Office